Figure 1:
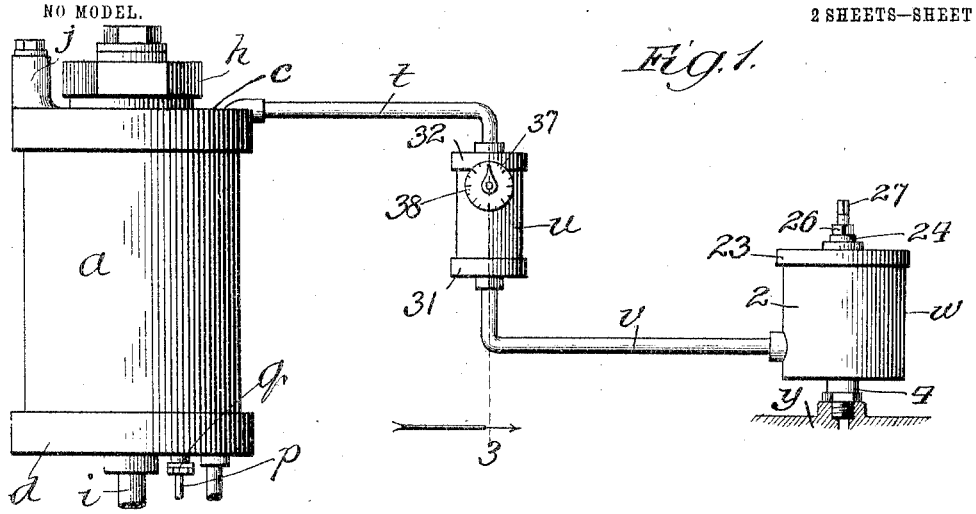

No. 777,120. PATENTED DEC. 13, 1904.
J. MEEHAN.
AUTOMATIC LUBRICATOR.
APPLICATION FILED DEC. 24, 1903.
NO MODEL. 2 SHEETS—SHEET 1.

Witnesses: Inventor:
James Meehan,
By Thomas F. Sheridan,
Atty.

No. 777,120. PATENTED DEC. 13, 1904.
J. MEEHAN.
AUTOMATIC LUBRICATOR.
APPLICATION FILED DEC. 24, 1903.
NO MODEL. 2 SHEETS—SHEET 2.

Witnesses:

Inventor:
James Meehan,
By Thomas F. Sheridan,
Atty.

No. 777,120.                                                         Patented December 13, 1904.

UNITED STATES PATENT OFFICE.

JAMES MEEHAN, OF ST. CHARLES, ILLINOIS.

AUTOMATIC LUBRICATOR.

SPECIFICATION forming part of Letters Patent No. 777,120, dated December 13, 1904.

Application filed December 24, 1903. Serial No. 186,434. (No model.)

*To all whom it may concern:*

Be it known that I, JAMES MEEHAN, a citizen of the United States, residing at St. Charles, in the county of Kane and State of Illinois, have invented certain new and useful Improvements in Automatic Lubricators, of which the following is a specification.

Subject-matter described but not claimed herein will be found described and claimed in an application for United States patent filed in my name April 11, 1904, Serial No. 202,664, for improvements in oil-supply indicators.

My invention relates to that class of lubricators having a reservoir provided with a differential piston adapted to maintain the lubricant at a pressure in excess of the pressure in the valve-chest, a passage for the lubricant from such reservoir communicating with the interior of the valve-chest, and means for automatically opening such passage from the oil-reservoir when the valve-chest contains steam under pressure, closing such oil-passage when the valve-chest is empty and the engine not in operation, and opening the oil-passage when the engine is running without steam in the valve-chest or "coasting," so as to form a partial vacuum in such valve-chest.

The principal object of the invention is to provide a simple, economical, and efficient automatic lubricator for engines.

A further object of the invention is to provide a lubricator for engines adapted to be operated automatically, so as to admit lubricant to the valve-chest when such chest contains steam under pressure, exclude the lubricant when the valve-chest is empty and the engine not in operation, and admit the lubricant when the valve-chest is empty and the engine running or coasting, so as to cause a vacuum in the valve-chest.

A further object of the invention is to provide, in an automatic lubricator having a reservoir for maintaining the lubricant under a pressure sufficient to feed the lubricant into the valve-chest when such valve-chest contains steam under pressure and having means for automatically regulating the amount of lubricant supplied, means for ascertaining the quantity of lubricant that is being supplied and consumed and means for ascertaining when the reservoir is empty.

Other and further objects of the invention will appear from an examination of the drawings and the following description and claims.

My invention consists in the features, combinations, and details of construction hereinafter described and claimed.

Figures 2, 3:
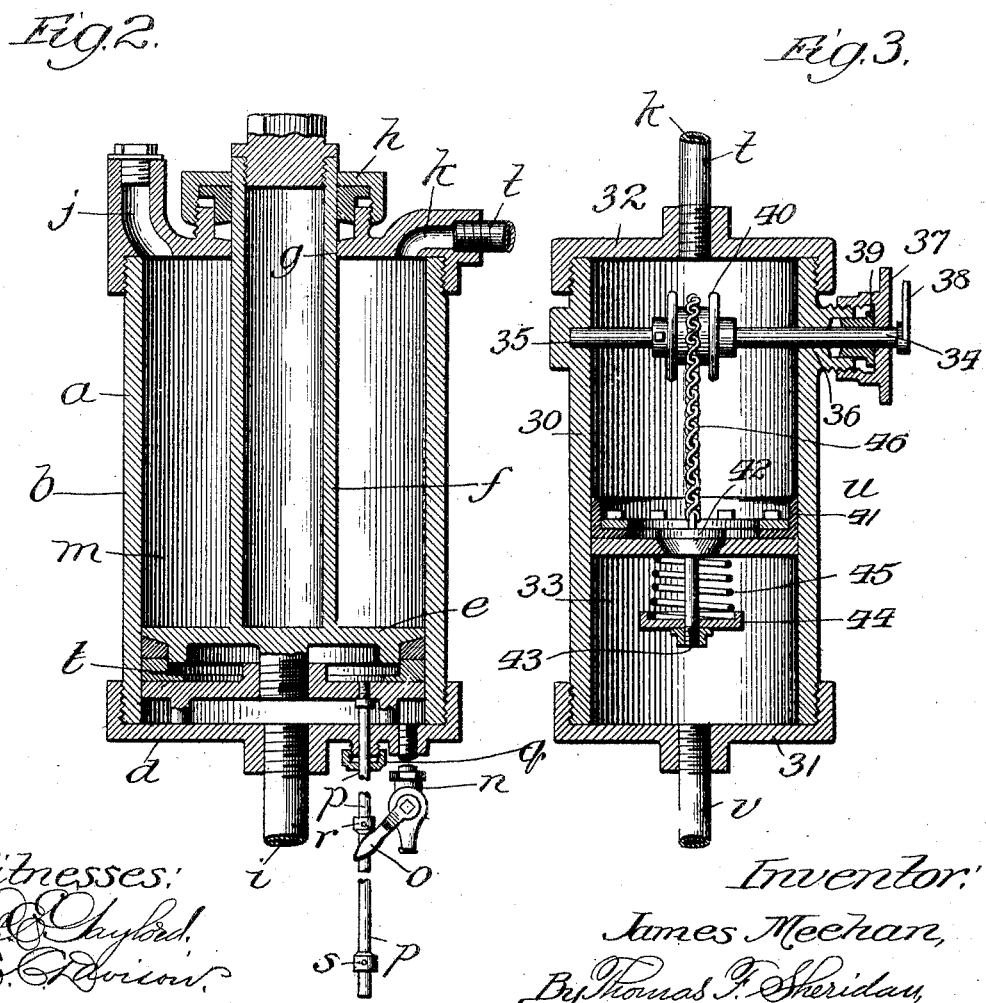
Figure 4:
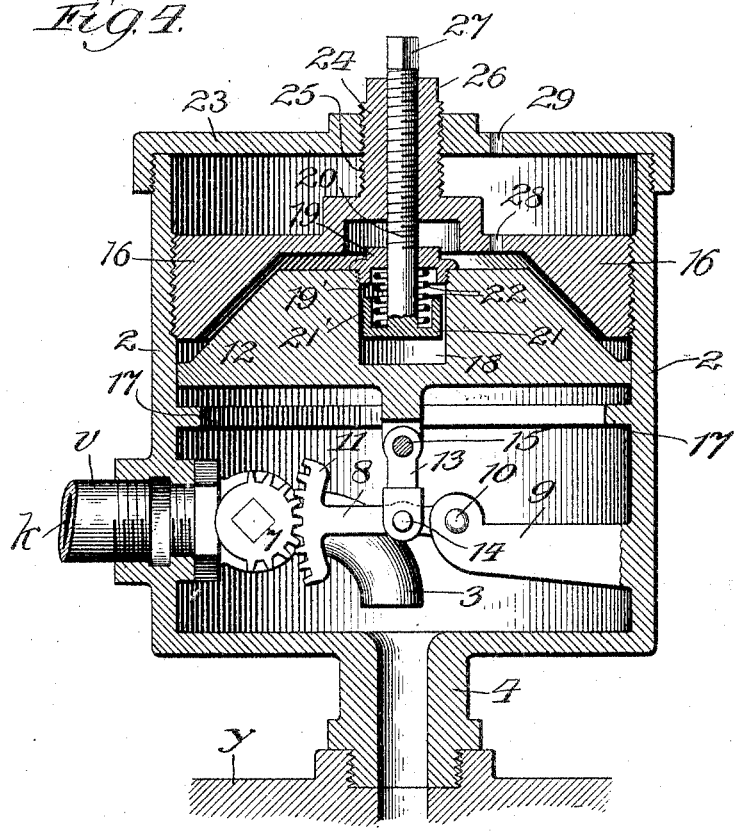
Figure 5:
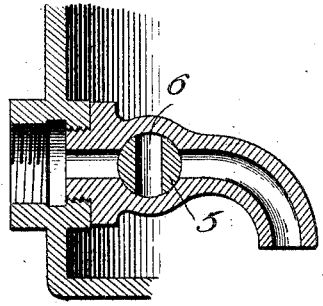

In the accompanying drawings, Figure 1 is a view in elevation of an automatic lubricator constructed in accordance with my improvements; Fig. 2, a sectional elevation of the reservoir; Fig. 3, a sectional elevation of the indicator; Fig. 4, a sectional elevation of the lubricator-valve and automatically-operated cock, and Fig. 5 a detail sectional elevation of the automatically-operated cock shown in Fig. 4.

In constructing an automatic lubricator in accordance with my improvements I provide a reservoir $a$, comprising an outer cylindrical casing $b$, having an upper head $c$ and a lower head $d$. A differential piston $e$ is slidably mounted in the chamber formed by such casing, having a central tubular portion $f$ slidably mounted in an axial opening $g$ in the upper head and provided with a suitable packing-box $h$. This differential piston, as will be seen from an inspection of Fig. 2, is mounted intermediate the steam-inlet passage $i$, which communicates with the steam-dome of a locomotive-engine (not shown) and the oil-inlet passage $j$ and oil-outlet passage $k$. The piston thus forms, in connection with the casing, a steam or pressure chamber $l$ on the lower side thereof and an annular oil-chamber $m$ on the upper side thereof. The superficial area of the piston on the lower side or steam side is greater than the area of such piston on the side which forms the oil-chamber, and the pressure in the steam-chamber is therefore sufficient to force the oil from the oil-chamber. It is of course well known that the pressure in the valve-chest is substantially equal to that in the steam-dome of an engine, and it will therefore be readily seen that when the oil-outlet passage communicates with the valve-chest the oil will be forced into the valve-chest, notwithstanding the pressure of the steam therein.

In order to provide means whereby the operator may be made aware that the oil-chamber of the reservoir is empty when all of the oil has been forced therefrom, I provide a hissing cock $n$ having a passage communicating with the steam-chamber of the reservoir and provided with an operating-lever $o$. A suitable rod $p$ is mounted in the piston movable therewith and extending out through the lower head of the reservoir through a suitable packing-box $q$, in which it is slidably mounted. The outer portion of this rod is provided with a shoulder or collar $r$, adapted to engage the operating-lever of the hissing cock and close such cock when the rod and piston are in their lower position, as shown in Fig. 2, such rod being provided with a similar collar or shoulder $s$ below the operating-lever of the hissing cock and adapted to move such lever upward from the position shown in Fig. 2 to open the cock when the piston is in its upper position and the oil-chamber empty or substantially empty.

The oil-outlet passage or channel $k$ communicates with the steam-valve chest $y$ of the engine to be lubricated and extends through a pipe $t$, indicator $u$, pipe $v$, lubricator $w$, and wall of the steam-valve chest $y$. In order to provide suitable means for automatically opening and closing this outlet-passage from the oil-reservoir and regulating the flow of oil as desired, the pipe $v$ is extended into the lubricator-casing 2 and has its inner end curved downward, so as to be directly over the opening in the base 4 of the lubricator-casing, and a two-way cock or valve 5, provided with a passage 6, is mounted in such last-mentioned pipe on the inner side of the casing.

In order to provide means for automatically operating the cock above described, and thereby opening and closing the oil-passage from the reservoir and regulating the flow of oil therefrom to the steam valve-chest of the engine, so as to admit oil to the valve-chest when it contains steam under pressure and also when a vacuum is formed in the valve-chest and exclude oil therefrom when the valve-chest is without steam under pressure and the engine not running, I provide a segmental gear 7, which is mounted upon the cock 6, already described, and an operating lever-arm 8 is pivotally mounted in a suitable bracket 9 on the inner side of the lubricator-casing by means of a suitable pivot 10 and is provided at its swinging end with a segmental gear 11, which meshes with the segmental gear upon the cock already described. A lubricator-piston 12 is mounted inside the casing 2 above this lever-arm and connected thereto by means of a link 13, which is pivotally connected to such lever-arm by means of a suitable pivot-pin 14 and to the piston by means of the pivot 15. To limit and regulate the extent of the upward movement of this piston, a suitable piston seat or guard 16 is adjustably mounted above it in threaded engagement with the outer casing. To limit its downward movement in case of the accidental breaking of any of the parts, an inner annular shoulder 17 on the inner side of the casing extends beneath the piston a sufficient distance from the piston-seat to afford space for the play of such piston. It will be seen that by this arrangement the piston-seat may be adjusted so as to limit the upward movement of the piston to any desired extent, and thereby control the quantity of oil supplied while the piston is in its uppermost position. In order to limit the downward movement of the piston in operation, so as to control the supply of oil furnished by such downward movement and also to provide means for holding the piston in its normal intermediate position, which closes the oil-passage, the piston is provided with an axial cylindrical pocket 18, having an axially-perforated cap 19, mounted at its upper end in threaded engagement with the piston and in sliding engagement with a threaded rod 20, which is mounted in threaded engagement with the piston-seat, such seat being provided with an axial perforation for receiving such rod. The lower end of this rod is provided with a head 21, and a spiral spring 22 is mounted between such head and the perforated cap 19, already described. An upwardly-extending annular flange portion 21' of the head engages a similar depending annular flange portion 19' of the cap when the piston is in its lowermost operative position, and the downward movement of the piston in operation is thus positively limited. The spiral spring is of sufficient rigidity to maintain the lubricator-piston in the position shown in Fig. 4—its intermediate position—when the threaded rod is properly adjusted and there is neither partial vacuum nor steam in the valve-chest of the engine, thus holding the cock in closed position. A suitable cap 23 closes the upper end of the lubricator-casing and is in threaded engagement therewith, so as to be easily removed and replaced, and the adjustable piston-seat is provided with an upwardly-extending stud 24, having external threads 25 in threaded engagement with such cap, such stud being squared at its outer end 26, so that the piston-seat may be adjusted as desired with relation to the piston. The threaded rod already described, by means of which the tension of the spring 22 is controlled and the downward movement of the piston limited when in operation, is squared at its upper end 27, so that the intermediate and lower position of the piston may be controlled as desired. By this arrangement it will be seen that when there is steam under pressure in the engine valve-chest such steam will pass into the chamber beneath the lubricator-piston and raise it to its uppermost position in engagement with the piston-seat, thus causing the segmental gears to automatically rotate the cock which controls the oil-passage to its open position. It will also be seen that when the spring which is mounted in the axial pocket of the lubricator-piston is held at the necessary tension it will maintain the piston in intermediate position when there is neither partial vacuum nor steam in the steam-chest. When the lubricator-piston is in this intermediate or initial position, the oil-passage is closed. It is also desirable that means be provided whereby oil may be automatically caused to pass into the engine valve-chest when the engine is running and there is no steam under pressure in the engine valve-chest to operate the lubricator-piston in the manner above described. In order to accomplish this purpose, I take advantage of the partial vacuum which is produced in the engine valve-chest when the engine is running without steam. A passage 28 is therefore provided in the lubricator-piston seat communicating with the outer atmosphere by way of a passage 29 in the cap for admitting air to the space between the lubricator-piston and valve-seat, so as to permit the piston to be moved to its lowermost position by means of atmospheric pressure above the piston when a partial vacuum is produced beneath the piston and in the engine valve-chest by running the engine without steam or coasting, the movement of the lubricator-piston to this lowermost position operating to open the oil-passage. It is also very desirable that means be provided whereby the quantity of oil which is being used may be determined at any time. In order to accomplish this, an indicator $u$, above mentioned, is provided, formed of a casing 30, having a lower base portion 31 and an upper cap 32, forming an inner oil passage or chamber 33, such indicator being mounted intermediate the pipes $t$ and $v$, above described, and forming in connection therewith a continuous passage for the oil from the oil-reservoir. A suitable shaft 34 is rotatably mounted in this casing near its upper end in suitable bearings 35 and 36, one end of which shaft extends out through a suitably-graduated dial 37. A hand 38 is mounted on the outer end of this shaft, rotatable therewith, a stuffing-box 39 being of course provided for preventing the escape of oil. A pulley 40 is mounted inside the casing on this shaft, rotatable therewith, and a piston 41 is provided, having a valve 42 seated in an axial perforation which extends through such piston, such valve being provided with a depending stem 43, having a head 44 at its lower end, and a spiral spring 45 is mounted intermediate such head and the lower side of the piston. A suitable chain 46 is mounted upon and connected to the pulley and has its lower end attached to the valve of the piston. The superficial area of the piston is greatly in excess of the area of the valve, and the spring which is mounted beneath the piston is sufficiently pliable so that it will not hold the valve to its seat when pressure is applied above the piston after the chain has reached its downward limit of motion. This spring will, however, hold the valve to its seat during the movement of the piston and the unwinding of the chain and only during such movement. By this arrangement it will be readily seen that when it is desirable to ascertain the quantity of oil being used the piston may be moved to its uppermost position by winding up the chain and that when it is in this position the pressure of the oil above the piston will cause the piston to move downward as rapidly as the oil escapes from beneath it. When the valve has reached its lowermost position, so that the chain refuses to allow it to descend farther, the piston will be pressed downward still farther against the spring, sufficiently to unseat the valve and permit a constant flow of oil through the piston when in its lowered position. In other words, oil will pass through the piston constantly except during the interval of time when the chain is being unwound and the indicator-shaft rotated, and during this interval, the dimensions of the oil-chamber being known, the quantity of oil used may be readily determined by the movement of the hand upon the dial.

I claim—

1. In an automatic lubricator, the combination of a lubricator-casing having a passage communicating with a valve-chest to be lubricated and an oil-inlet passage communicating with a source of oil-supply, a cock mounted in such oil-inlet passage, and a piston mounted in the lubricator-casing and connected with such cock for opening and closing the oil-inlet passage, substantially as described.

2. In an automatic lubricator, the combination of a lubricator-casing having a passage communicating with a valve-chest to be lubricated and an oil-inlet passage communicating with a source of oil-supply, a cock mounted in such oil-inlet passage inside the lubricator-casing, a valve slidably mounted in such lubricator-casing, and lever mechanism connecting such piston and cock, substantially as described.

3. In an automatic lubricator, the combination of a lubricator-casing having a passage communicating with a valve-chest and having an oil-inlet passage communicating with a source of oil under pressure, a cock mounted in the oil-inlet passage and inside of the lubricator-casing and provided with a segmental gear, a piston slidably mounted in the casing, a pivotally-mounted operating-lever having a segmental gear upon its swinging end in engagement with the segmental gear upon the cock, and means for connecting such operating-lever with the piston, substantially as described.

4. In an automatic lubricator, the combination of a lubricator-casing having a passage communicating with a valve-chest and having an oil-inlet passage communicating with a source of oil-supply, a piston-seat mounted in such casing and provided with a passage communicating with the outer atmosphere, and a piston slidably mounted in such casing movable into and out of engagement with such piston-seat and provided with means for opening and closing the oil-inlet passage, substantially as described.

5. In an automatic lubricator, the combination of a lubricator-casing having a passage communicating with a valve-chest and having an oil-inlet passage communicating with a source of oil-supply, a cock mounted in such oil-passage, a piston-seat provided with an opening communicating with the outer atmosphere, a piston mounted in such casing and movable into and out of engagement with the piston-seat, and means for connecting such piston with the cock, substantially as described.

6. In an automatic lubricator, the combination of a lubricator-casing having a passage communicating with a valve-chest and having an oil-inlet passage communicating with a source of oil-supply, a piston-seat adjustably mounted in such casing and provided with a passage communicating with the outer atmosphere, a piston slidably mounted in such casing normally out of engagement with such piston-seat and movable from such position toward and from the piston-seat, and provided with means movable thereby for opening and closing the oil-inlet passage, substantially as described.

7. In an automatic lubricator, the combination of a lubricator-casing having a passage communicating with a valve-chest and having an oil-inlet passage communicating with a source of oil-supply, a piston-seat mounted in such casing and provided with a passage communicating with the atmosphere, a piston slidably mounted in such casing movable into and out of engagement with such piston-seat, provided with means for opening and closing the oil-inlet passage, and means for holding such piston in initial position out of engagement with the piston-seat to close the oil-inlet passage, substantially as described.

8. In an automatic lubricator, the combination of a lubricator-casing having a passage communicating with the valve-chest of an engine and having an oil-inlet passage communicating with a source of oil-supply, a piston-seat mounted in such casing having an opening on the opposite side of the piston to that on which the passage to the steam-chest is situated, a piston provided with means for opening and closing such oil-inlet passage and slidably mounted in such casing normally out of engagement with the piston-seat when the oil-inlet passage is closed and movable in one direction from such position to open the oil-inlet passage when the valve-chest contains steam under pressure and in the opposite direction to open such oil-inlet passage when a partial vacuum is formed in the valve-chest, substantially as described.

9. In an automatic lubricator, the combination of a lubricator-casing having a passage communicating with the valve-chest of an engine and having an oil-inlet passage communicating with a source of oil-supply, a piston-seat mounted in such casing provided with a passage communicating with the outer atmosphere, a piston slidably mounted in such casing movable into and out of engagement with such piston-seat, means for holding such piston in initial position out of engagement with the piston-seat, and mechanism connected with the piston and operable thereby for opening and closing the oil-inlet passage, substantially as described.

10. In an automatic lubricator, the combination of a lubricator-casing having a passage communicating with the valve-chest of an engine and having an oil-inlet passage communicating with a source of oil-supply, a piston-seat mounted in such casing provided with a passage communicating with the outer atmosphere, a piston slidably mounted in such casing movable into and out of engagement with such piston-seat and provided with an axial pocket therein, a threaded rod provided with a head mounted in such pocket, a spring mounted upon such rod forming a yielding connection with the piston, and mechanism connected with the piston operable thereby for opening and closing the oil-inlet passage, substantially as described.

11. In an automatic lubricator, the combination of an oil-reservoir provided with an oil-outlet passage communicating with the valve-chest of an engine and having a steam-inlet passage, piston mechanism mounted in such reservoir intermediate the steam-inlet passage and the oil-outlet passage dividing the interior of such reservoir into oil and steam chambers on opposite sides of such piston, means for automatically opening and closing such oil-outlet passage, a hissing cock provided with a passage communicating with the steam-chamber of such reservoir and having an operating-lever, and an operating-rod mounted upon the piston and connected with the operating-lever of such hissing cock, substantially as described.

JAMES MEEHAN.

Witnesses:
HARRY IRWIN CROMER,
MAUDE DARNELL.